(12) United States Patent
Boeke

(10) Patent No.: US 11,973,426 B2
(45) Date of Patent: Apr. 30, 2024

(54) UNIVERSAL BUCK CONVERTER

(71) Applicant: SIGNIFY HOLDING B.V., Eindhoven (NL)

(72) Inventor: Ulrich Boeke, Langerwehe (DE)

(73) Assignee: SIGNIFY HOLDING B.V., Eindhoven (NL)

(*) Notice: Subject to any disclaimer, the term of this patent is extended or adjusted under 35 U.S.C. 154(b) by 44 days.

(21) Appl. No.: 17/912,605

(22) PCT Filed: Mar. 15, 2021

(86) PCT No.: PCT/EP2021/056516
§ 371 (c)(1),
(2) Date: Sep. 19, 2022

(87) PCT Pub. No.: WO2021/185753
PCT Pub. Date: Sep. 23, 2021

(65) Prior Publication Data
US 2023/0179096 A1 Jun. 8, 2023

(30) Foreign Application Priority Data

Mar. 20, 2020 (EP) ..................................... 20164504

(51) Int. Cl.
*H02M 3/158* (2006.01)
*H02M 1/32* (2007.01)
*H02M 7/06* (2006.01)

(52) U.S. Cl.
CPC ............ *H02M 3/158* (2013.01); *H02M 1/32* (2013.01); *H02M 7/06* (2013.01)

(58) Field of Classification Search
None
See application file for complete search history.

(56) References Cited

U.S. PATENT DOCUMENTS

| 2006/0232253 | A1* | 10/2006 | Salato | H02M 1/36 323/225 |
| 2010/0013548 | A1* | 1/2010 | Barrow | H02M 1/36 327/536 |

(Continued)

*Primary Examiner* — Jared Fureman
*Assistant Examiner* — Aqeel H Bukhari

(57) ABSTRACT

The invention relates to a buck converter comprising an input for receiving an input voltage, an output node for providing an output voltage to a load, a rectifier circuit coupled to the input, a first switch coupled between a first output of the rectifier circuit and a switching node, a second switch coupled between the switching node and a second output of the rectifier circuit, an inductor coupled between the switching node and the output, a first capacitor coupled between the first output of the rectifier and the output, a second capacitor coupled between the output and the second output of the rectifier and a controller. The controller controls the first switch and the second switch and arranged to operate the buck converter in a first mode and a second mode. In the first mode an output connection is formed between the output node and the second output of the rectifier circuit, the first switch is arranged to operate as a buck converter switch, the second switch is arranged to operate as a synchronous freewheel switch. In the second mode an output connection is formed between the first output of the rectifier circuit and the output node, the first switch is arranged to operate as the synchronous freewheel switch, the second switch is arranged to operate as a buck converter switch and wherein the controller is arranged to receive a mode control signal for operating the buck converter in the first mode or the second mode.

11 Claims, 8 Drawing Sheets

(56) References Cited

U.S. PATENT DOCUMENTS

2013/0223120 A1\* 8/2013 Dragojevic ......... H02M 1/4225
  363/126
2015/0357912 A1 12/2015 Perreault et al.
2017/0099011 A1\* 4/2017 Freeman ................ H02M 7/06

\* cited by examiner

UNIVERSAL BUCK CONVERTER

CROSS-REFERENCE TO PRIOR APPLICATIONS

This application is the U.S. National Phase application under 35 U.S.C. § 371 of International Application No. PCT/EP2021/056516, filed on Mar. 15, 2021, which claims the benefit of European Patent Application No. 20164504.1, filed on Mar. 20, 2020. These applications are hereby incorporated by reference herein.

FIELD OF THE INVENTION

The invention relates to a buck converter. The invention further relates to a lighting system. The invention further relates to a method for controlling a buck converter.

BACKGROUND OF THE INVENTION

Installers of electric infrastructure of public lighting and their customers aim to use DC power microgrids to supply public road lighting. FIG. 1 illustrates such a DC microgrid. The electric energy consumed by luminaires connected to a DC microgrid comes first from rectified 400 V, 3-phase AC mains and second from photovoltaic solar power systems that is a DC power source.

As can be seen in FIG. 1, two buck converters are used to convert the input power into a desired output power. Two different types of buck converters are needed as one is operated in a first location, i.e. at the high side and the other buck converter is operated in a second location, i.e. at the low side.

It is an object of the invention to provide a buck converter that can be operated in different configurations so that it can operate at the high side location as well as on the low side location.

SUMMARY OF THE INVENTION

It is an objective of the invention to provide a buck converter that can be operated in different configurations.

To overcome this concern, in a first aspect of the invention, a buck converter is provided comprising:
an input for receiving an input voltage;
an output node for providing an output voltage to a load;
a rectifier circuit coupled to the input;
a first switch coupled between a first output of the rectifier circuit and a switching node;
a second switch coupled between the switching node and a second output of the rectifier circuit;
an inductor coupled between the switching node and the output;
a first capacitor coupled between the first output of the rectifier and the output;
a second capacitor coupled between the output and the second output of the rectifier; and
a controller for controlling the first switch and the second switch and arranged to operate the buck converter in a first mode and a second mode,
wherein in the first mode;
an output connection is formed between the output node and the second output of the rectifier circuit;
the first switch is arranged to operate as a buck converter switch;
the second switch is arranged to operate as a synchronous freewheel switch;
and wherein in the second mode;
an output connection is formed between the first output of the rectifier circuit and the output node;
the first switch is arranged to operate as the synchronous freewheel switch;
the second switch is arranged to operate as a buck converter switch;
and wherein the controller is arranged to receive a mode control signal for operating the buck converter in the first mode or the second mode.

The buck converter according to this aspect can be configured to operate in a first mode as a buck converter having a low side output. By changing the operation of the buck converter in a second mode, the buck converter has a high side output i.e. a floating output. This change of mode can be done without any significant hardware modifications because the output capacitor is divided between both the high side output and the low side output of the buck converter.

In a further example, the buck converter has a rectifier circuit that is arranged to receive a three phase input voltage.

In case high power is required, a three phase input is needed to allow the large power to be provided to the buck converter.

In a further example, the mode control signal is provided via one of a wireless control signal, a mechanical switch, or a voltage provided to an input of the controller.

The provision of the mode control signal allows the buck converter to operate in the first mode or the second mode or change the mode of operation. A wireless control signal can be provided by an installer via a handheld device allowing a simple configuration of the buck converter. a mechanical switch can be present in the socket where the buck converter is installed into. By installing the buck converter in a high side socket, the mechanical switch may be configured such that the buck converter is automatically configured as a high side buck converter. The same could apply for the low side socket, where the mechanical switch is configured such that the buck converter is configured as a low side buck converter upon inserting the buck converter in the low side socket. The buck converter can be arranged so that it can receive signals from two different mechanical switches so that the mechanical switch in the high side socket can be positioned differently compared to the mechanical switch in the low side socket.

In a further example, the buck converter comprises a power factor corrector between the rectifier circuit and the first switch and the second switch.

When a lamp or luminaire operates with a rated power above 25 Watts is being consumed by the load and buck converter, a power correction needs to be performed according to regulations.

In a further example, a third switch is coupled in series with the first capacitor and a fourth switch is coupled in series with the second capacitor, wherein the third switch and the fourth switch are arranged to limit an inrush current during start-up of the buck converter.

This allows the capacitors at the high side and low side to be connected or disconnected to the rest of the circuit. When the third switch is opened, the first capacitor is disconnected from the rest of the circuit i.e. no current can flow through the capacitor anymore. This can be done in the case the buck converter is operated in the first (low side) mode where the first capacitor would serve no function. Consequently, when the fourth switch is opened, the second capacitor is disconnected from the rest of the circuit. This can be done in case the buck converter is operated in the second (high side)

mode where the second capacitor would serve no function. Additionally, the switches can be used to prevent a too large inrush current from occurring. When one of the switches is opened during startup of the buck converter or when the buck converter is provided with power from the input voltage, the capacitors can not charge and a too large inrush current is prevented. Additionally, by preventing the capacitor connected to the output of the buck converter to charge, an undesired voltage build up at the output can be prevented, which might otherwise result in an undesired or uncontrolled activation of the load.

In a further example, the third and fourth switches are arranged to limit the inrush current by closing the third and fourth switch in a linear operation. Operating the switches in a linear operation allows the capacitors to charge with a predefined current. This allows the inrush current to be limited to a defined value and also allows the capacitor to charge such that the output voltage is controllably increased.

In a further example, during start-up of the buck converter and in the first mode, the fourth switch is arranged to be closed, and wherein, during start-up of the buck converter and in the second mode, the third switch is arranged to be closed. This allows to limit the inrush current during operation in the first mode and during operation in the second mode.

In another example, a driver is provided comprising:
a first buck converter according to any of the preceding examples and arranged to operate in the first mode,
a second buck converter according to any of the preceding examples and arranged to operate in the second mode,
wherein the second output of the rectifier circuit of the first buck converter is coupled to the first output of the rectifier circuit of the second buck converter,
wherein an output of the lighting system is between the output node of the first buck converter and the output node of the second buck converter.

This driver is capable of providing a positive and a negative output voltage. Depending on how the load is connected, a single high voltage load can be connected to both of the output nodes or two different loads can be connected between the output nodes with a return path to the connection between the first and second buck converters, which is in this example the second output of the rectifier circuit of the first buck converter.

In another example, a lighting system is provided, where the lighting system comprises:
the driver; and
the load, the load being a single load or a dual load;
wherein the single load is coupled to driver between the output node of the first buck converter and the output node of the second buck converter; and
wherein the dual load is coupled to the driver between the output node of the first buck converter and the second output of the rectifier circuit of the first buck converter and between the output node of the second buck converter and the second output of the rectifier circuit of the first buck converter.
the driver can be used to provide power to a lighting load, wherein the lighting load can be configured as a single lighting load or a dual lighting load.

In another example, the lighting load is an LED load.

According to another example, a method is provided for controlling a buck converter, the buck converter comprising:
an output node for providing an output voltage to a load;
a rectifier circuit coupled to the input;
a first switch coupled between a first output of the rectifier circuit and a switching node;
a second switch coupled between the switching node and a second output of the rectifier circuit;
an inductor coupled between the switching node and the output;
a first capacitor coupled between the first output of the rectifier and the output;
a second capacitor coupled between the output and the second output of the rectifier; and
a controller;
and wherein the method comprises:
operating the buck converter in a first mode, wherein in the first mode:
an output connection is formed between the output node and the second output of the rectifier circuit;
the first switch is arranged to operate as a buck converter switch;
the second switch is arranged to operate as a synchronous freewheel switch;
operating the buck converter in a second mode, wherein in the second mode; an output connection is formed between the first output of the rectifier circuit and the output node;
the first switch is arranged to operate as the synchronous freewheel switch;
the second switch is arranged to operate as a buck converter switch.

BRIEF DESCRIPTION OF THE DRAWINGS

Examples of the invention will now be described with reference to the accompanying drawings, in which.

DETAILED DESCRIPTION OF THE EMBODIMENTS

Figure 1:
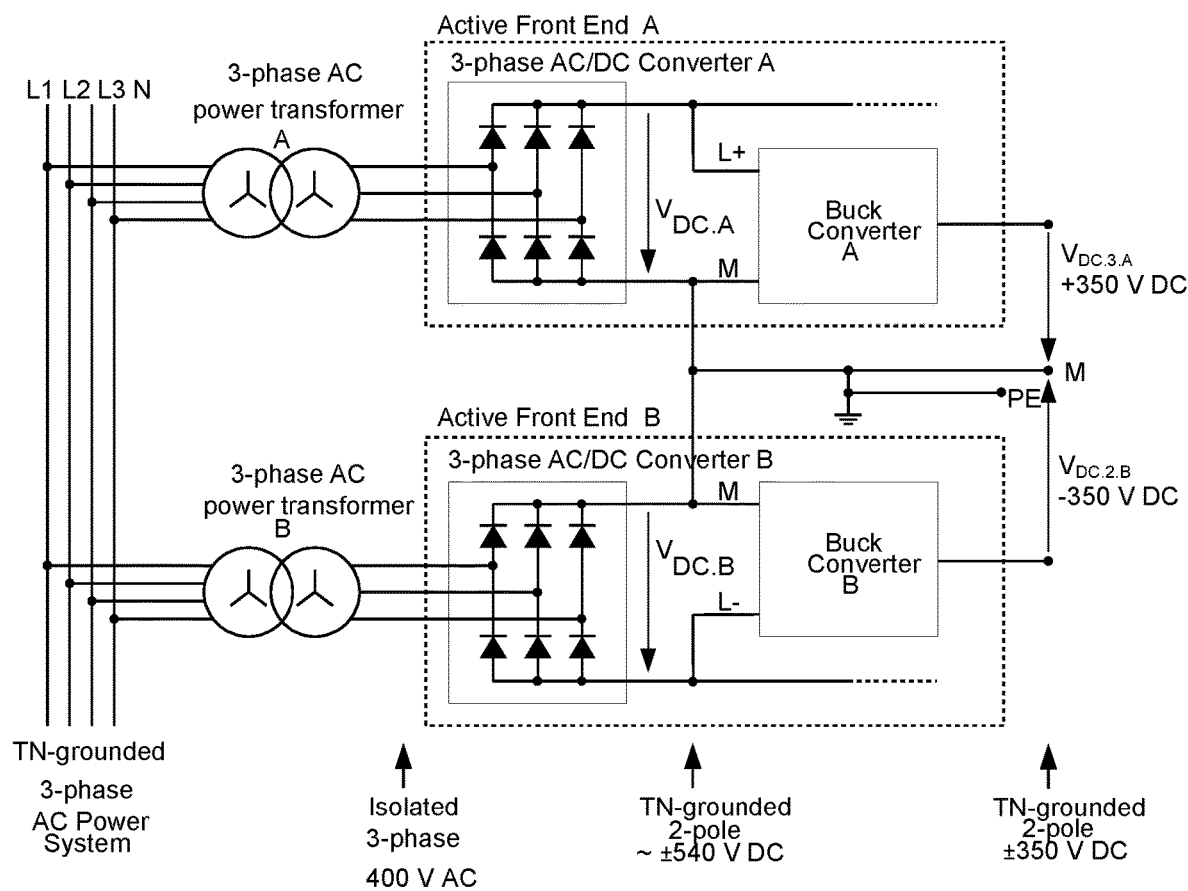
FIG. 1 shows an example of a current system having two different buck converters.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

FIG. 1 shows a known system with a first 3-phase AC power system, a second 3-phase power system and a third 3-phase AC power system. The first 3-phase AC power system with the conductors L1, L2, L3 and N is characterized to have an earth connected start-point of the transformer winding and it is connected to not shown electricity generators. The second 3-phase AC power system is characterized by an isolation from earth that is provided by the windings of power transformer A. The third 3-phase AC power system is characterized by an isolation from earth that is provided by the windings of power transformer B.

The isolated second 3-phase AC power system is connected to the input of a first 3-phase bridge rectifier generating DC bus voltage A. DC Bus voltage A is the input voltage of Buck converter A. Buck converter A is operating in a first mode, mode A, having its output voltage with respect to the negative pole of the input voltage as will be discussed with FIG. 2.

The isolated third 3-phase AC power system is connected to the input of a second 3-phase bridge rectifier generating DC bus voltage B. DC Bus voltage B is the input voltage of Buck converter B. Buck converter B is operating in a second mode, mode B, having its output voltage as difference between the positive pole of input voltage and the output as will be discussed with FIG. 3.

The ground reference of the first buck converter, i.e. the low potential of the rectifier bridge of the first buck converter, is connected to the high potential of the rectifier bridge of the second buck converter. This allows the two buck converters to create a positive and a negative voltage with respect to the mid-point line "M". The first converter generates a positive voltage with respect to the mid-point M and the second buck converter generates a negative voltage with respect to the mid-point M. The mid-point M line can also be connected to earth to have a protected-earth (PE) conductor used in Terre-Neutral-Separated (TN-S) earthing systems. A first load can be connected between the output of the first buck converter and the mid-point M. A second load can be connected between the mid-point and the output of the second buck converter.

Both buck converters are dedicated for their position. This means that because of their hardware design, the buck converters cannot be interchanged between each other.

Figure 2:
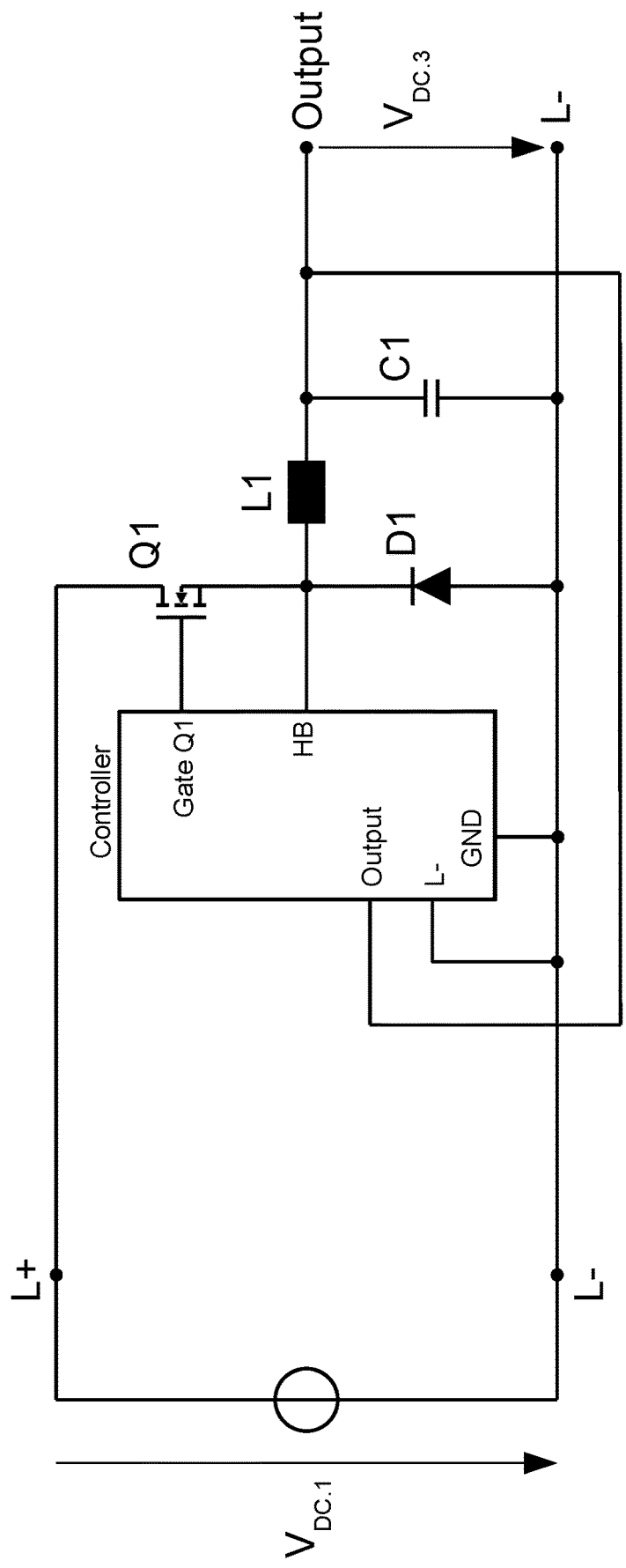
FIG. 2 shows an example of a known buck converter having its output voltage with respect to the negative pole of the input voltage.

FIG. 2 shows a buck converter that is characterized to have the output voltage over capacitor C1 between the output terminal and the ground reference of the input voltage. The switch Q1 allows the inductor L1 to build up an inductor current when the switch is closed. When the switch is opened, the inductor current is discharged through the freewheeling diode D1 towards the load and the capacitor C1. In the case the load is connected to the L− terminal the current returns through the L− conductor back through the freewheeling diode. In case the load is connected between the two outputs of the buck converters, i.e. without a mid-point conductor, the current flows back through the inductor L1 and the diode D1 of the second buck converter.

Figure 3:
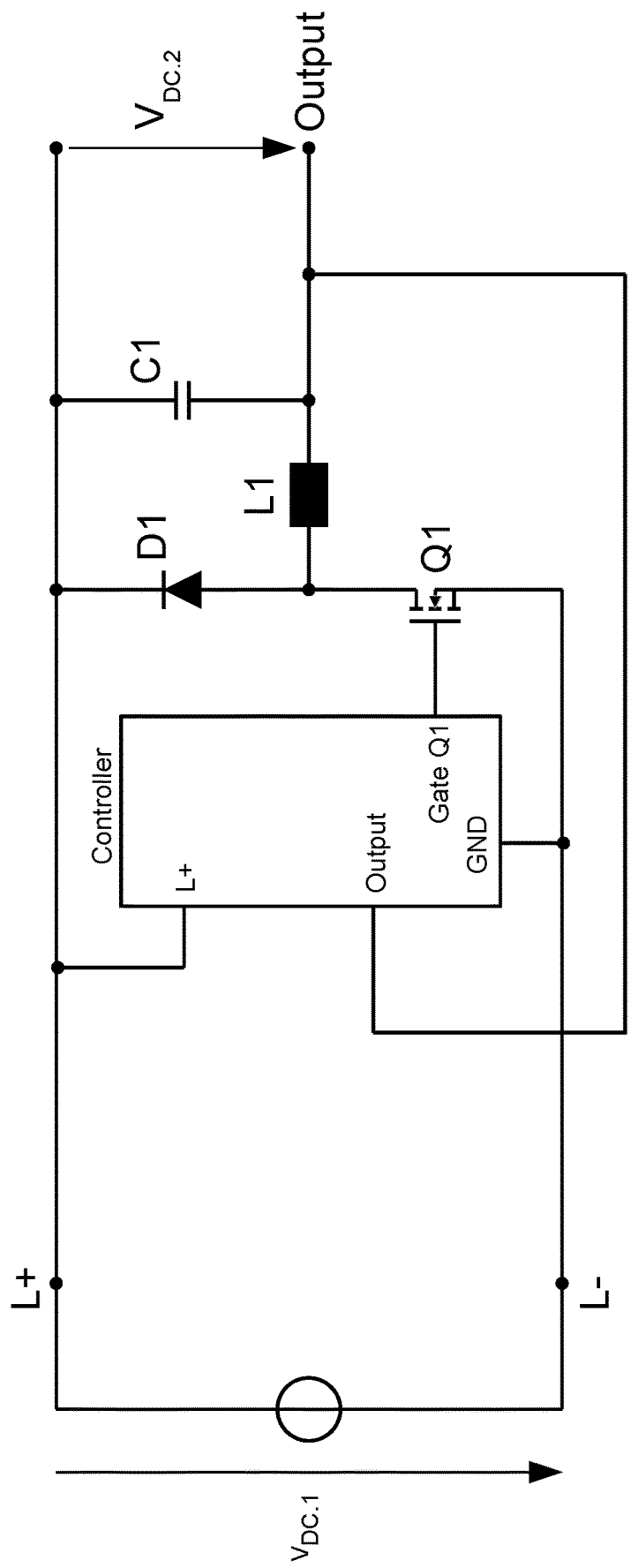
FIG. 3 shows an example of a known buck converter having its output voltage as difference between the positive pole of input voltage and the output.

FIG. 3 shows a buck converter that is characterized to have the output voltage as difference between the positive input voltage L+ and the output over the capacitor C1 The switch Q1 allows the inductor L1 to build up an inductor current when the switch is closed. When the switch is opened, the inductor current is discharged through the freewheeling diode D1 towards the load and the capacitor C1. In the case the load is connected to the L+ terminal the current flows through the L+ terminal to the load and back to the inductor L1. In case the load is connected between the two outputs of the buck converters, i.e. without a mid-point conductor, the current flows back through the diode D1 and the inductor L1 of the first buck converter.

Figure 4:
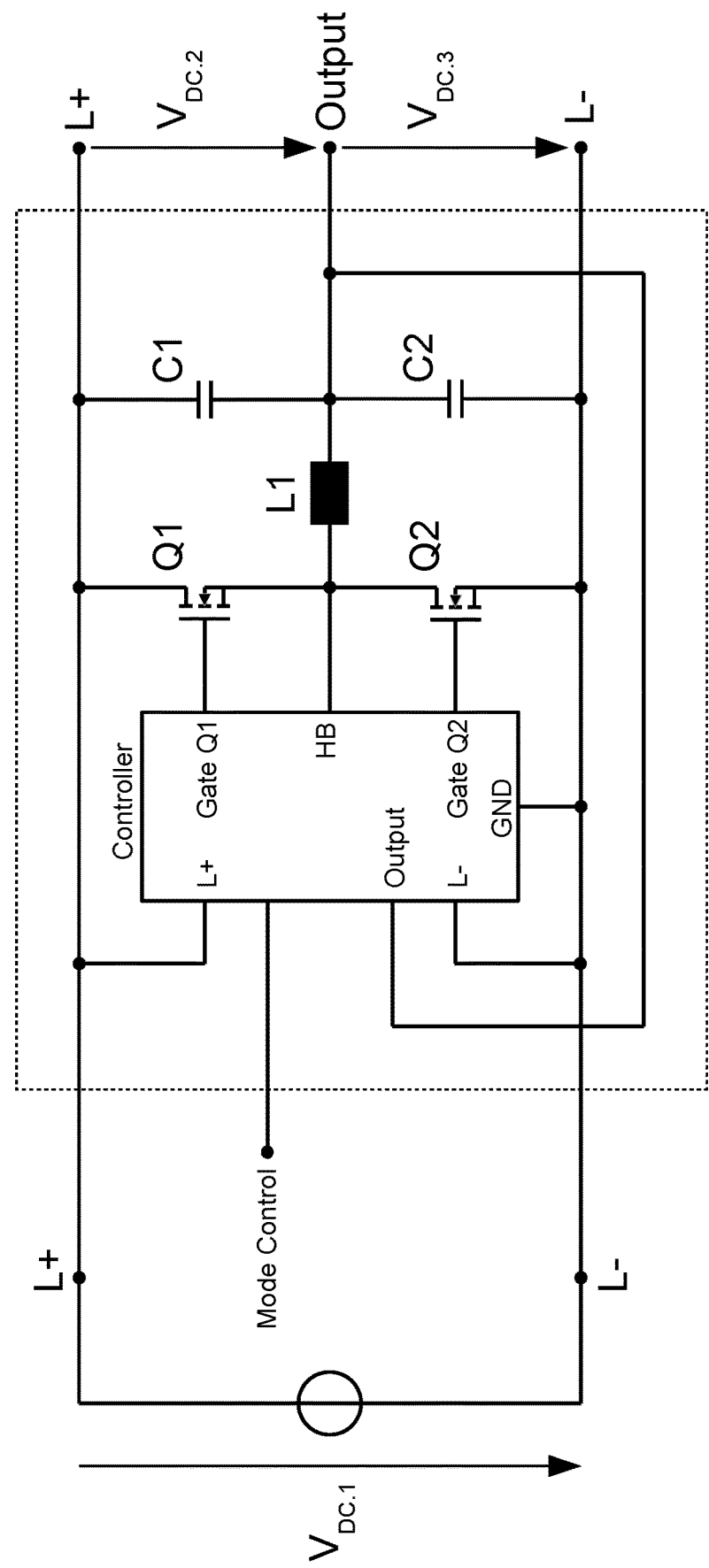
FIG. 4 shows an embodiment of a buck converter according to the invention.

FIG. 4 shows an embodiment of the buck converter according to the invention. The buck converter receives an input voltage, which can be a DC voltage or a rectified AC voltage. If desired, a power factor correction circuit can be introduced between the supply voltage and the inputs L+ and L−. L+ and L− can also be derived from a three-phase input voltage. A suitable rectifier can be used for rectification of the three-phase voltage. Additionally, the power factor correction circuit can be introduced after the rectifier. The buck converter further has two switches coupled in series between the inputs L+ and L−. The first switch Q1 is coupled between the input voltage bus L+ and a switching node HB. A second switch Q2 is coupled between the switching node HB and the ground reference L−. An inductor L1 is coupled between the switching node HB and an output node Output. A first capacitor C1 is coupled between the input voltage bus L+ and the output node Output. A second capacitor C2 is coupled between the output node Output and the ground reference L−. A controller is used for controlling the first switch Q1 and the second switch Q2 so that a desired power can be delivered to the output node Output. In this example, the output voltage is used as a feedback signal, but the skilled person understands that many more ways are possible to control the buck converter e.g. output current control or a feedforward way of control.

A mode control signal is provided to the controller. This allows the controller to be configured so that the buck converter operates in a first mode or a second mode. The control signal can be provided in many different ways such as by a wireless signal, a mechanical switch or a controlled voltage applied to the mode control input. The buck converter can be configured so that the output voltage for connecting the load can positive or negative with respect to a ground reference potential. In a first mode, for providing the positive voltage $V_{DC.3}$, the buck converter is controlled to control the second switch Q2 as a freewheeling diode and the first switch Q1 is controlled as the switch for controlling the current build up in the inductor L1. Although only the second capacitor C2 is in parallel to the output voltage $V_{DC.3}$ both the first capacitor C1 and the second capacitor C2 are contributing to the filtering and stabilizing of the output voltage.

When the buck converter is operated in a second mode, by providing a different mode control signal, the first switch Q1 is a freewheeling diode and the second switch Q2 is controlled as the switch for controlling the current build up in the inductor L1. Although only capacitor C1 is in parallel to the output voltage $V_{DC.2}$ both the first capacitor C1 and the second capacitor C2 are contributing to the filtering and stabilizing of the output voltage.

Figure 5:
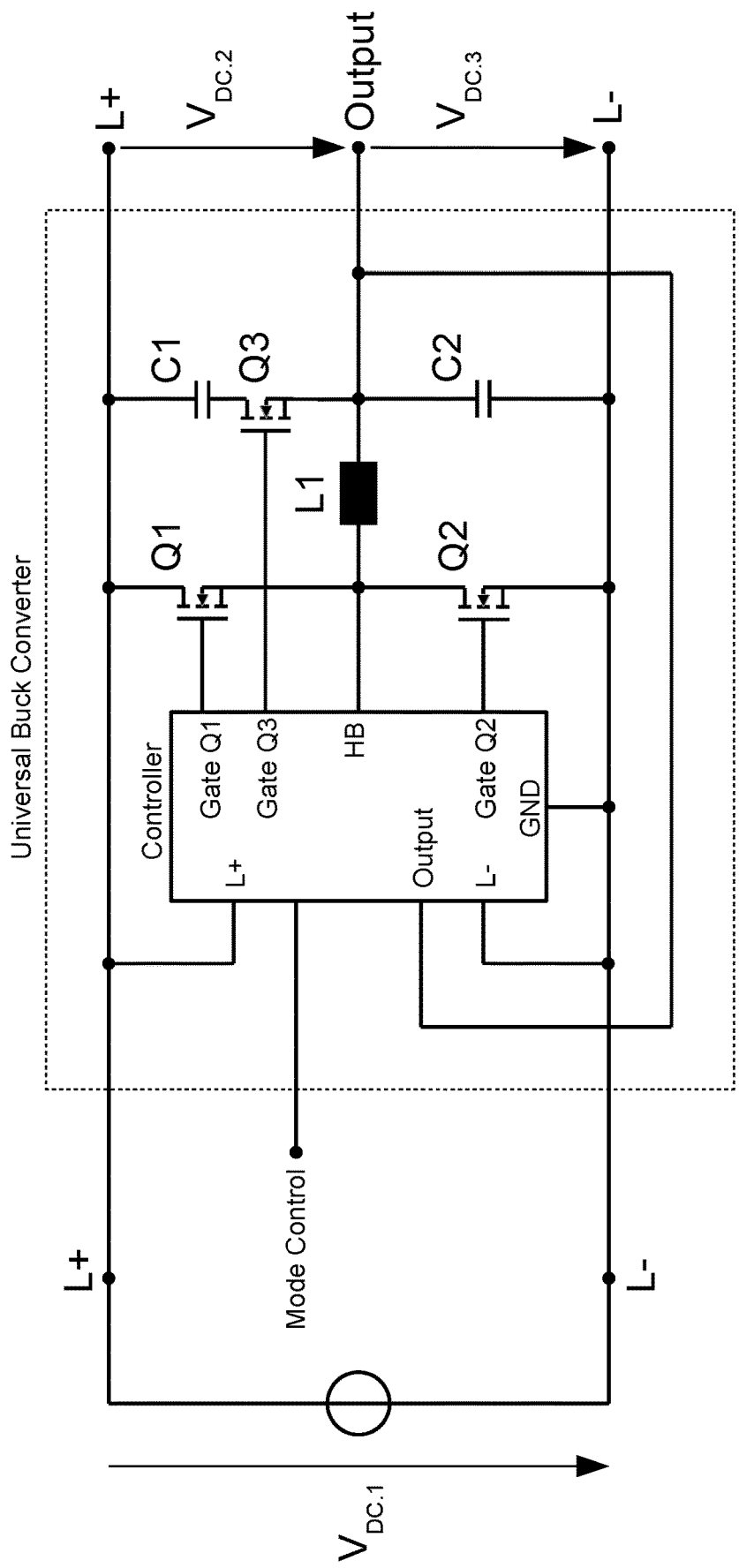
FIG. 5 shows another embodiment of a buck converter according to the invention.

In FIG. 5, an example of a buck converter according to the invention is provided. The buck converter of FIG. 5 shows the same technical features as the buck converter described in FIG. 4. The buck converter now also includes a third switch Q3, which is coupled in series with the first capacitor C1. Because the first capacitor C1 and the second capacitor C2 are coupled in series between the input, this can cause a large inrush current to flow upon powering up the buck converter. To prevent a too large inrush current from happening, a switch can be placed in series with one the first capacitor C1 and the second capacitor C2. In FIG. 5, the third switch Q3 is placed in series with the first capacitor C1. This means that the series combination of the first capacitor C1 and the third switch Q3 are placed at the output node Output of the buck converter i.e. the series combination is used for stabilizing the output voltage. The third switch Q3 can be opened upon powering up of the buck converter. This can be the moment when the input voltage is being provided to the buck converter by turning a switch between the input voltage and the buck converter on. Because the third switch Q3 is opened, no current can flow through the series connection of the first capacitor C1 and the second capacitor C2 because the series path is interrupted by the third switch Q3. When the staring up period has passed, the third switch Q3 can be closed with a defined conductivity so that the first capacitor C1 can be charged with a controlled inrush current through the third switch Q3, the inductor L1 and the second switch Q2. After that period the Buck converter is increasing and controlling the output voltage $V_{DC.3}$ and operating in the first mode.

Figure 6:
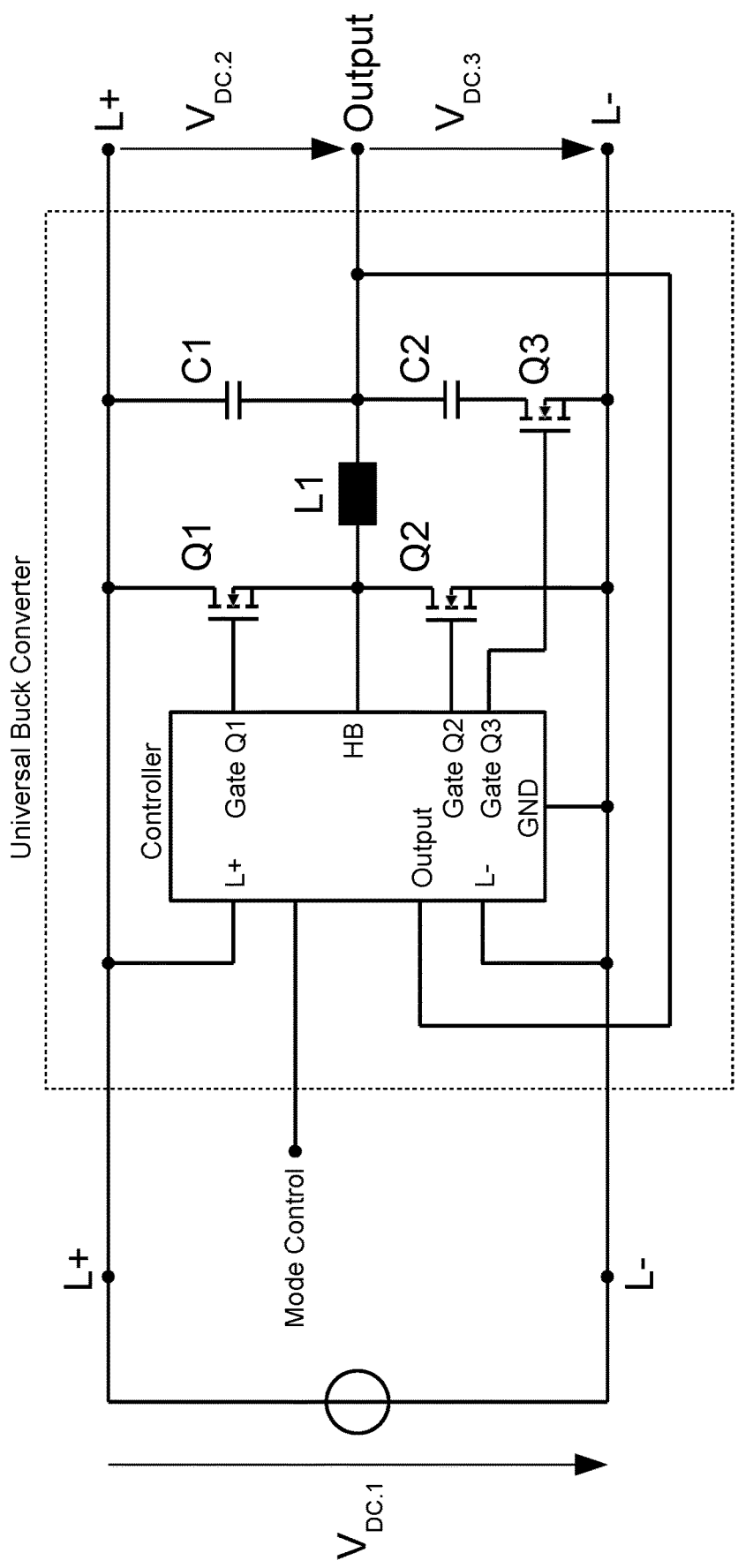
FIG. 6 shows a further different embodiment of a buck converter according to the invention.

In FIG. 6, another example of a buck converter according to the invention is described. The buck converter of FIG. 6 shows the same technical features as the buck converter described in FIG. 4 In this example, the third switch Q3 is coupled in series with the second capacitor C2. The function of the third switch Q3 is similar to that of the third switch Q3 in FIG. 5. The series path between the first capacitor C1 and the second capacitor C2 is interrupted, at least during the powering up of the buck converter, so an excessive inrush current is prevented. When the staring up period has passed, the third switch Q3 switch can be closed with a defined conductivity so that the second capacitor C2 can be charged with a controlled inrush current through Q1, L1 and Q3. After that period the Buck converter is increasing and controlling the output voltage $V_{DC.2}$ and operating in the second mode.

Figure 7:
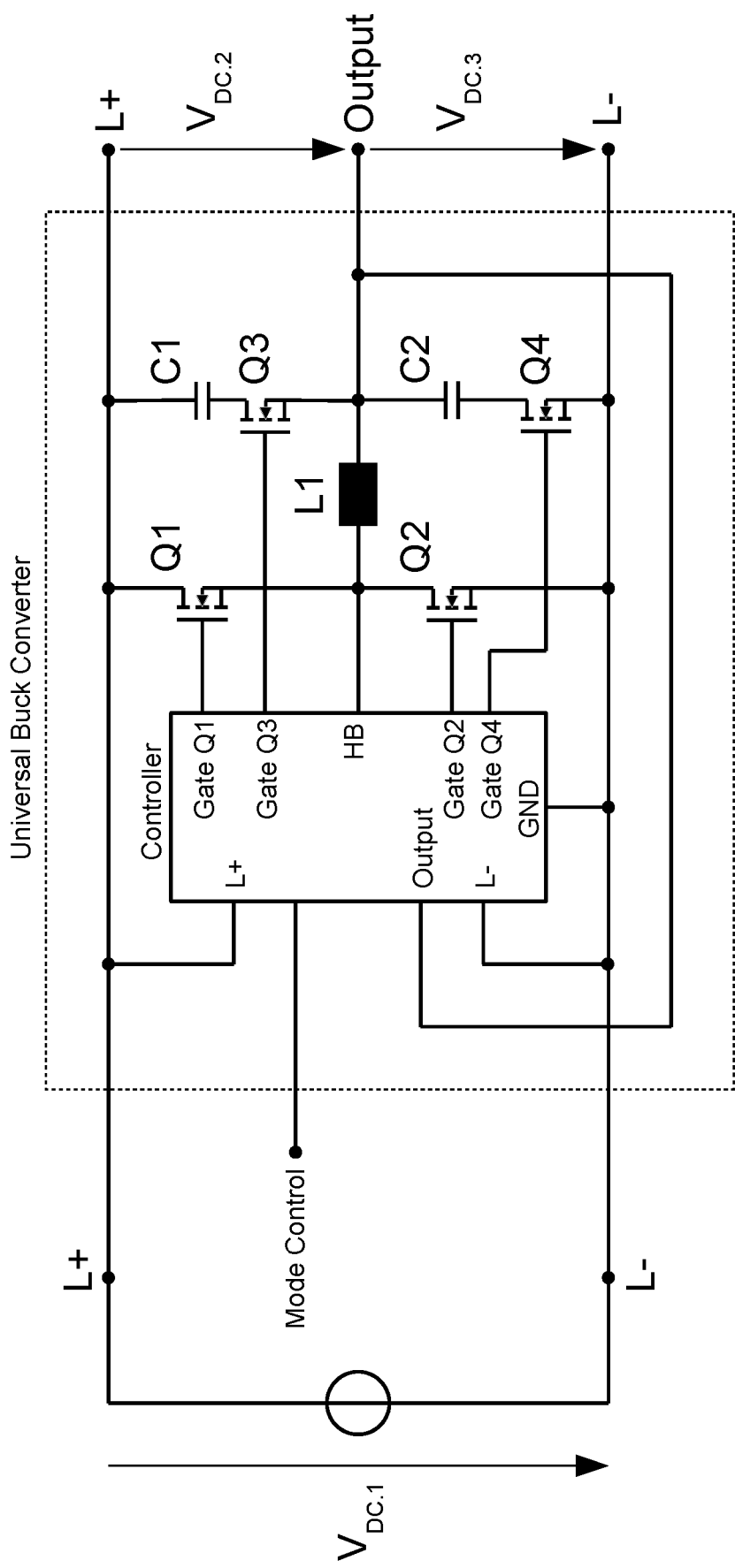
FIG. 7 shows a further different embodiment of a buck converter according to the invention.

In FIG. 7, discloses a preferred example of a buck converter according to the invention. The buck converter of FIG. 7 shows the same technical features as the buck converter described in FIG. 4. A third switch Q3 is coupled in series with the first capacitor C1 and a fourth switch Q4 is connected in series with the second capacitor C2. Similar to the buck converters shown in FIGS. 5 and 6, the inrush current is limited by opening at least one of the third switch Q3 and the fourth switch Q4.

By having two switches Q3 and Q4, it is possible to configure which of the third switch Q3 and fourth switch Q4 is to be opened, based on the mode of operation, i.e. the first mode or second mode, selected for the buck converter. For example, if the buck converter is configured to operate in the first mode, the second switch Q2 is configured to operate as a freewheeling diode and the first switch Q1 is controlled as the switch for controlling the current build up in the inductor L1. The third switch Q3 is arranged to be closed after the powering up of the buck converter is arranged to be constantly closed. If the buck converter is operated in the second mode, the second switch Q2 is configured to operate as the switch for controlling the current build up in the inductor L1 and the first switch Q1 is controlled as the freewheeling diode. The fourth switch Q4 is arranged to be closed after the powering up of the buck converter and the third switch Q3 is arranged to be constantly closed.

Alternatively, in the first mode the third switch Q3 can remain open and in the second mode, the fourth switch Q4 can remain opened.

Figure 8:
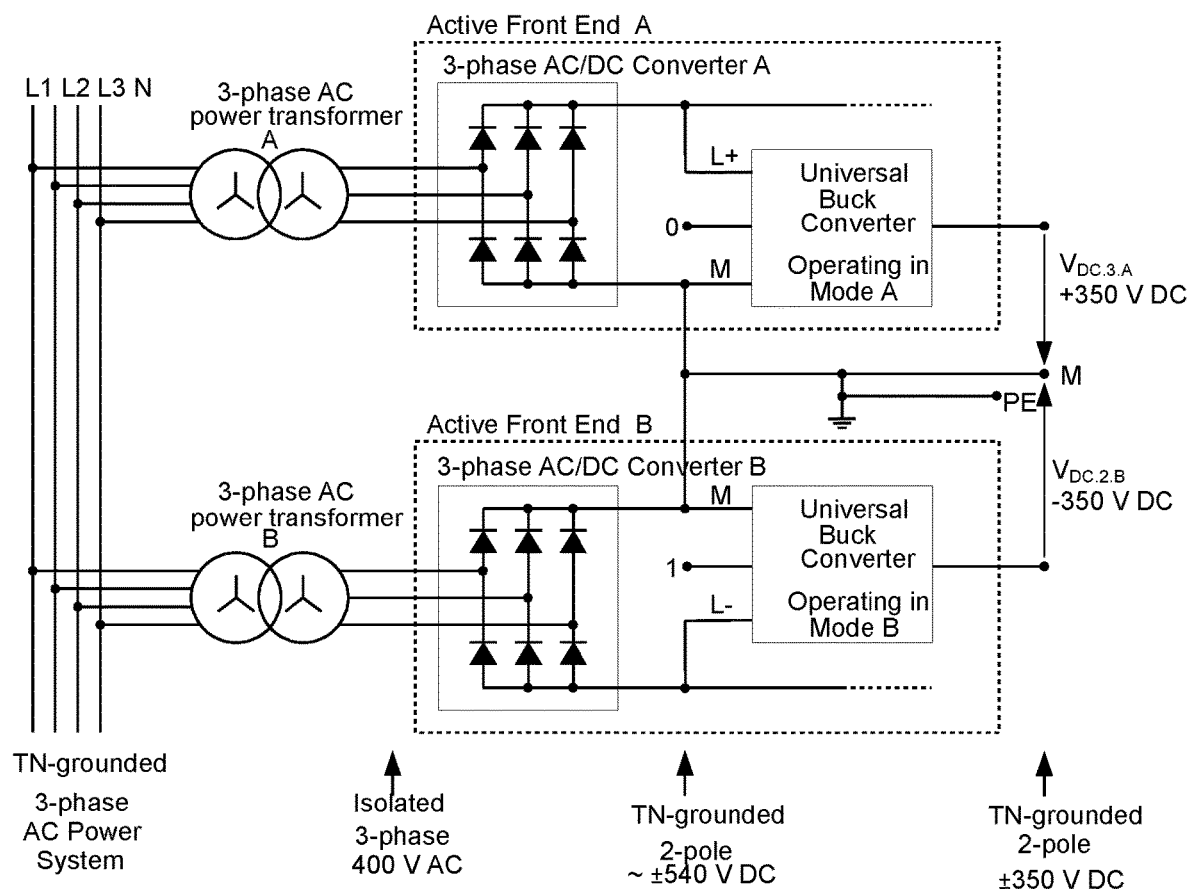
FIG. 8 shows an embodiment of a system according to the invention.

FIG. 8 shows an electric power system that has two similar buck converters. The first buck converter is configured via the mode control signal to operate in the first mode and is placed on the high side of the electric power system. The second buck converter is configured via the control mode signal to operate in the second mode and is placed on the low side of the electric power system.

In this example, both buck converters receive galvanically isolated three phase input voltages from two three-phase AC buses. These input voltages are rectified by two three-phase rectifier circuits and provided individually to the two buck converters. A connection from the second output of the rectifier circuit A of the first buck converter A to the first output of the rectifier circuit B of the second buck converter B is realized to allow both buck converters to generate individual voltages with respect to the mid-point M.

The connection of the load depends on the requirements of the load, when a load with a large voltage requirement is connected to the electric power system, the load is connected between the outputs of the two buck converters. In this example, the load will receive a voltage of +350 V and −350 V, so a total of 700 V.

When a load with a lower voltage requirement is being used, two different loads can be connected between the outputs of the buck converters. In this case, the mid-point connection is needed. Both loads are connected to the mid-point connection M. Because of the Terre Neutral protection, the mid-point and Protective-Earth connections are connected to each other. Because of the connection between the first and second buck converter, with respect to the Protective-Earth, a positive voltage is created by the first buck converter A and a negative voltage is created by the second buck converter B. In this example, a positive voltage of 350 V is provided by the first buck converter and a negative voltage of −350 V is created by the second buck converter. Two loads requiring 350 V can be connected to the two buck converters.

With respect to the aforementioned examples of the invention, the controller can be embodied in many different ways, such as, but not limited to, a microcontroller, an FPGA, a dedicated chip or analog control circuitry.

The loads connected to the buck converters can be any kind of loads such as, but not limited to, electric motors, lighting loads, preferably an LED lighting load.

To improve the power factor of the system comprising the buck converter, a power factor correction circuit can be placed between the rectifier circuit and the buck converter. The coupling of the first switch and the second switch is then done via the power factor correction circuit. An example of a power factor correction circuit can be a boost converter.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A buck converter comprising:
   an input for receiving an input voltage;
   an output node for providing an output voltage to a load;
   a rectifier circuit coupled to the input;
   a first switch (Q1) coupled between a first output of the rectifier circuit and a switching node;
   a second switch (Q2) coupled between the switching node and a second output of the rectifier circuit;
   an inductor (L1) coupled between the switching node and the output node;
   a first capacitor (C1) coupled between the first output of the rectifier and the output node;

a second capacitor (C2) coupled between the output node and the second output of the rectifier; and
a controller for controlling the first switch (Q1) and the second switch (Q2) and arranged to operate the buck converter in a first mode and a second mode,
wherein in the first mode;
an output connection is formed between the output node and the second output of the rectifier circuit;
the first switch (Q1) is arranged to operate as a buck converter switch;
the second switch (Q2) is arranged to operate as a synchronous freewheel switch;
and wherein in the second mode;
an output connection is formed between the first output of the rectifier circuit and the output node;
the first switch (Q1) is arranged to operate as the synchronous freewheel switch;
the second switch (Q2) is arranged to operate as a buck converter switch;
and wherein the controller is arranged to receive a mode control signal for operating the buck converter in the first mode or the second mode.

2. The buck converter according to claim 1, wherein the rectifier circuit is arranged to receive a three-phase input voltage.

3. The buck converter according to claim 1, wherein the mode control signal is provided via one of a wireless control signal, a mechanical switch, or a voltage provided to an input of the controller.

4. The buck converter according to claim 1 further comprising a power factor circuit between the rectifier circuit and a series combination of the first switch and the second switch.

5. The buck converter according to claim 1, wherein a third switch is coupled in series with the first capacitor and a fourth switch is coupled in series with the second capacitor.

6. The buck converter according to claim 5, wherein the third switch and the fourth switch are arranged to limit the inrush current by closing the third switch and the fourth switch in a linear operation.

7. The buck converter according to claim 5, wherein, during start-up of the buck converter and in the first mode, the fourth switch is arranged to be closed, and wherein, during start-up of the buck converter and in the second mode, the third switch is arranged to be closed.

8. A driver comprising:
a first buck converter according to the buck converter of claim 1 and arranged to operate in the first mode,
a second buck converter according to the buck converter of claim 1 and arranged to operate in the second mode,
wherein the second output of the rectifier circuit of the first buck converter is coupled to the first output of the rectifier circuit of the second buck converter,
wherein an output of the driver is between the output node of the first buck converter and the output node of the second buck converter.

9. A lighting system comprising:
the driver according to claim 8; and
the load, the load being a single lighting load or a dual lighting load;
wherein the single lighting load is coupled to driver between the output node of the first buck converter and the output node of the second buck converter; and
wherein the dual lighting load is coupled to the driver between the output node of the first buck converter and the second output of the rectifier circuit of the first buck converter and between the output node of the second buck converter and the second output of the rectifier circuit of the first buck converter.

10. The lighting system according to claim 9, wherein the lighting load is an LED load.

11. A method for controlling a buck converter, the buck converter comprising:
an input for receiving an input voltage;
an output node for providing an output voltage to a load;
a rectifier circuit coupled to the input;
a first switch coupled between a first output of the rectifier circuit and a switching node;
a second switch coupled between the switching node and a second output of the rectifier circuit;
an inductor coupled between the switching node and the output node;
a first capacitor coupled between the first output of the rectifier and the output node;
a second capacitor coupled between the output node and the second output of the rectifier; and
a controller;
wherein the method comprises:
operating the buck converter in a first mode, wherein in the first mode:
an output connection is formed between the output node and the second output of the rectifier circuit;
the first switch is arranged to operate as a buck converter switch;
the second switch is arranged to operate as a synchronous freewheel switch;
operating the buck converter in a second mode, wherein in the second mode;
an output connection is formed between the first output of the rectifier circuit and the output node;
the first switch is arranged to operate as the synchronous freewheel switch;
the second switch is arranged to operate as a buck converter switch.

* * * * *